United States Patent [19]

Brill

[11] Patent Number: 4,462,978

[45] Date of Patent: Jul. 31, 1984

[54] PREPARATION OF HYDROGEN PEROXIDE

[75] Inventor: William F. Brill, Skillman, N.J.

[73] Assignee: The Halcon SD Group, Inc., New York, N.Y.

[21] Appl. No.: 448,566

[22] Filed: Dec. 10, 1982

[51] Int. Cl.³ .............................................. C01B 15/02
[52] U.S. Cl. ..................................................... 423/584
[58] Field of Search ......................................... 423/584

[56] References Cited

U.S. PATENT DOCUMENTS 3,490,872  1/1970  Fenton ................................. 423/656
4,223,001  9/1980  Novotny et al. ..................... 423/655

OTHER PUBLICATIONS

Zudin et al, "Catalytic Synthesis of Hydrogen Peroxide from Oxygen and Water in the Presence of Carbon Monoxide and Galladium Phosphine Complexes," *Kinet. Katal.* (1979), 20(6), 1599–1600.

*Primary Examiner*—John Doll
*Assistant Examiner*—Wayne A. Langel
*Attorney, Agent, or Firm*—William C. Long; Riggs T. Stewart; Harold N. Wells

[57] ABSTRACT

Hydrogen peroxide is produced in a reaction between carbon monoxide, oxygen, and water in the presence of a solvent using a Group 8 noble metal as a catalyst. Especially preferred as the working solution is palladium chloride in acetone.

10 Claims, No Drawings

PREPARATION OF HYDROGEN PEROXIDE

PRIOR ART

The invention relates to the production of hydrogen peroxide, a material of commerical importance, which is used in large volumes for bleaching and chemical oxidations. Industrially, hydrogen peroxide is produced primarily by the alternative oxidation and reduction of anthraquinone or the oxidation of isopropanol.

Other methods of producing hydrogen peroxide have been studied. One method of interest with respect to the present invention is the direct oxidation of hydrogen with gaseous oxygen, generally in the presence of a catalyst. Such a process was known at least as early as 1914, for example, see U.S. Pat. No. 1,108,752 to Henkel, et al. In that patent, hydrogen and oxygen were reacted in the presence of palladium as a catalyst in a water solution. More recently, considerable interest has been shown in further development of this process. In U.S. Pat. No. 4,007,256 Kim, et al., employ a supported palladium catalyst and a solvent comprising water, acid, and a nitrogen-containing compound. Dalton, et al., U.S. Pat. No. 4,336,239 discloses a similar system using an acidic organic or nitrogenous compound as a solvent. Hooper, et al., in U.S. Pat. No. 3,361,533 discloses the use of Group 1 or Group 8 metals, preferably palladium, supported on a solid and employs a working solution comprising water, acid, or oxygen-containing organics such as acetone. Alternative schemes are represented by Dyer, et al., U.S. Pat. No. 4,128,627 who employs a Group 8 metal, preferably palladium, which is linked to Group 5b compounds, preferably phosphorus. Again, water and organic materials are used as solvents. Moseley, et al. in U.S. Pat. No. 4,336,240 shows a similar system, but employs fluorocarbons as solvents.

Another process reacts carbon monoxide and oxygen with water to form hydrogen peroxide and carbon dioxide. An early patent, U.S. Pat. No. 302,800 to Traube, shows a mixed water gas containing carbon monoxide and hydrogen will produce hydrogen peroxide when burned with oxygen in a flame and then contacted with liquid water. Insufficient deetails are provided to determine the extent to which carbon monoxide and hydrogen produce hydrogen peroxide in this method, but it is clear that such a high temperature non-catalytic procedure where both carbon monoxide and hydrogen are present in readily distinguished from the process to be disclosed hereinafter.

A more recent disclosure by Zudin, et al., in Kinet Katal 1979 20 (6) 1599-1600 clearly discloses the reaction of carbon monoxide and oxygen with water in the presence of a palladium catalyst associated with phosphine ligands and using methylene chloride as a solvent. Zudin employed titanium (IV) sulfate in order to trap hydrogen peroxide in the water phase to reduce decomposition and to assist in the recovery.

The present invention relates to a method of carrying out the formation of hydrogen peroxide by the reaction of carbon monoxide, water, and oxygen, which does not involve the use of ligands, which may contribute to the decomposition of hydrogen peroxide, and does not employ an additional chemical reaction for trapping hydrogen peroxide as it is produced.

SUMMARY OF THE INVENTION

Hydrogen peroxide is produced in a reaction involving carbon monoxide, oxygen and water and in the absence of gaseous hydrogen. The reaction is carried out in the presence of a Group 8 noble metal catalyst, preferably palladium, typically introduced as a noble metal compounds, such as an acid, chloride, acetate, or nitrate. The catalyst concentration may be about 0.001–0.5 mol catalyst/liter of solution and preferably is 0.01–0.1 mol catalyst/liter of solution. A solvent such as a carbonyl compound or nitrile is employed to facilitate the reaction. Preferably, carbonyl compounds are used, most preferably, acetone. The amount of solvent used is affected by the desired quantity of water and the ability of the solvent to dissolve the catalyst. The solvent should hold some amount of water in solution, preferably about 0.5 to 5 wt %. With acetone, the working solution would contain 1 to 2 wt % water.

Sufficient amounts of the reacting gases (i.e. CO and $O_2$) are supplied to maintain a total pressure of above 1 kg/cm² absolute. The molar ratio of $CO/O_2$ should be 1/9 to 9/1, as determined by the catalyst and solvent employed.

The reaction is carried out at temperatures in the range of −78° to +150° C., preferably −20° to +50° C.

DESCRIPTION OF THE PREFERRED EMBODIMENTS

The process of the invention may be described by means of the following overall reaction.

$$CO + H_2O + O_2 \xrightarrow{Catalyst} H_2O_2 + CO_2$$

The reaction is catalyzed by a Group 8 noble metal compound. Without the presence of such metal compounds, no reaction occurs. No ligands, such as the readily oxidized tri-phenyl phosphine employed by Zudin, et al., need be used. It is believed that addition of such ligands has a detrimental effect upon the hydrogen peroxide produced. Furthermore, it has been found that trapping the hydrogen peroxide as done by Zudin, et al., is not required. In a preferred mode of carrying out the invention, separation may be made by extracting hydrogen peroxide and water from the solvent.

The process may be carried out batchwise or continuously. In a batch process, the liquid components of the working solution would be charged to a pressure vessel. These would include the solvent, such as acetone, and a suitable amount of water. Depending upon the nature of the solvent, the water may be present dissolved in the solvent or as a separate phase which supplies water to the solvent as required to replace water converted to hydrogen peroxide. The catalyst will be added in a form which can be dissolved in the working solution. A Group 8 noble metal salt capable of being dissolved in water is generally preferred. The vessel would be closed and pressured to the desired level with carbon monoxide and oxygen. Using suitable agitation to assure good contacting of the reactants and controlling the temperature to the desired range, the reaction would be carried out until sufficient hydrogen peroxide had been produced. After the desired amount of hydrogen peroxide has been produced, the vessel would be depressured and the hydrogen peroxide separated from the working solution by extraction, distillation or other suitable means.

A continuous reaction could be carried out by various techniques familiar to those skilled in the art. For example, the batch reaction described above could be adapted to a continuous operation in which depletion of carbon monoxide and oxygen and production of carbon dioxide could be compensated for by withdrawing a stream of gases from above the working solution, removing carbon dioxide by scrubbing and returning the gases to the reactor, adding the carbon monoxide and oxygen as required. The hydrogen peroxide formed in the reactor could be extracted from the working solution by continuously feeding water into the reactor and withdrawing an equal amount of the working solution which is contacted with a suitable solvent. After separation of the hydrogen peroxide, the residual working solution would be returned to the reactor.

The conditions under which the invention is carried out will be selected to most efficiently provide the desired conversion of water to hydrogen peroxide. The temperature employed will be determined by various factors. Sub-ambient temperatures are favored to provide good yields of hydrogen peroxide, but since refrigeration is required to obtain low temperatures, increased costs are incurred. Broadly, the reaction may be carried out at temperatures between about $-78°$ and $+150°$ C., preferably between about $-20°$ and $+50°$ C. The operating pressure should be above atmospheric (i.e. about 1 $kg/cm^2$ absolute) in order to supply ample carbon monoxide and oxygen per unit of reactor volume relative to the liquid working solution. The molar ratio of carbon monoxide to oxygen should be about 1/9 to 9/1.

The working solution, excluding the dissolved catalyst, comprises primarily a solvent and water. Water is a reactant and also helps to dissolve the catalyst compound in the solvent. While any amount of water might be used, in practice the water content is determined by its effect on catalyst solubility during the reaction. Preferably about 0.5 to 5 wt % of the solution is water. Where the solvent is capable of absorbing the desired amount of water only a single liquid phase is present. If a solvent having only a limited capacity for water is used, then a second water phase may be present, which supplies water to the reaction taking place in the solvent phase as it is gradually depleted of its water content.

The solvent is a very important component of the working solution. As will be seen, extent of the reaction appears to be strongly affected by the type of solvent used, suggesting that it may play a part in the reaction itself, although the actual role of the solvent has yet to be understood. Generally, solvents may be carbonyl-containing hydrocarbons or nitriles. Preferably carbonyl-containing hydrocarbons such as acetone, methyl ethyl ketone, and 2,4 pentanedione are used. The amount of solvent is not especially critical. At least enough is used to dissolve the catalyst compound and the water needed for the reaction. More than this minimum amount is generally preferred to facilitate the reaction.

The reaction of carbon monoxide, water, and oxygen to form hydrogen peroxide and carbon dioxide appears to be catalyzed by Group 8 noble metals, that is, platinum, palladium, rhodium, ruthenium, iridium, and osmium. Of these, palladium is particularly effective. The overall reaction does not take place in the absence of a Group 8 noble metal, which is considered to be a catalyst, although the mechanism by which the noble metal operates has not been established as yet. However, the reaction is not simply one in which the noble metal participates in the reaction as is shown by the examples hereinafter in which the metal in its highest oxidation states is shown to be effective. If the metal had been introduced at a lower oxidation state it might have participated in the reaction without being catalytic, since it might have been oxidized by the oxygen present to form a dioxygen metal complex, which was subsequently hydrolyzed to produce hydrogen peroxide.

The Group 8 noble metal catalyst typically will be in the form of a metal compound, such as an acid, chloride, acetate, or nitrate. Typical of the noble metal compounds found to be useful are palladium chloride and palladium acetate. It is not necessary to employ ligands such as the triphenyl phosphine of Zudin, et al. In fact, it is preferred to avoid their use since they may contribute to the decomposition of hydrogen peroxide. Unless disposed on a solid support, the noble metal compound(s) selected as a catalyst should be soluble in the working solution comprising a solvent and water. That mode of operation is preferred. However, a supported noble metal may be used in a slurry or fixed bed made familiar to those skilled in the art.

The amount of catalytic metal may be expressed as a concentration in the working solution of about 0.001 to 0.5 mol noble metal per liter of working solution. Preferably, about 0.01 to 0.1 mol/liter are employed. If the noble metal is disposed on a solid support an equivalent amount would be used.

EXAMPLE 1

A 0.05 M palladium chloride solution, prepared by adding 0.71 g (4 milli-mols) to 80 ml of acetone containing 0.8 ml of water, was placed in the glass liner of a 300 ml type 316 stainless steel autoclave having a magnetically-driven stirrer and an internal cooling coil, all of which had been cleaned and passivated with concentrated nitric acid. The autoclave was closed and pressured to establish partial pressures of 21.1 $kg/cm^2$ for oxygen and 4.2 $kg/cm^2$ for carbon monoxide. The reaction was carried out at room temperature with stirring of the working solution, while samples were periodically removed and analyzed. Titration of the solution with 0.1 N ceric sulfate showed the solution to contain 0.12 M $H_2O_2$ after 2 hours, 0.2 M $H_2O_2$ after 3 hours and 0.25 M $H_2O_2$ after 5 hours. It was found that metal deposited from the solution on the metal surfaces of the reactor. This was presumed to be elemental palladium, which would be consistent with the observation that a lower yield of hydrogen peroxide was obtained in subsequent experiments. Measurement of the oxygen produced by oxidizing with potassium permanganate a sample of working solution after four hours reaction confirmed the presence of hydrogen peroxide.

Example 2

The experiment of Example 1 was repeated using a solution of 0.177 g (1 milli mole) of palladium chloride in 19 ml of acetone and 1 ml of a buffer solution containing monobasic potassium phosphate-sodium hydroxide to maintain a pH of 7. The reaction was carried out at room temperature in a 125 ml glass-lined pressure vessel using partial pressures of 21.1 $kg/cm^2$ for carbon monoxide and 4.2 $kg/cm^2$ for oxygen. After three hours, the working solution was found to contain 0.06 M $H_2O_2$ by titration with standard ceric nitrate. The effluent gas contained 3.2 milli-moles of carbon dioxide as measured by gas chromatography.

Example 3

The experiment of Example 2 was repeated using a solution of 0.177 g (1 milli-mole) of palladium chloride, 19.8 ml of acetone and 0.2 ml of distilled water. The reaction was carried out in a 25° C. constant temperature bath in a 125 ml glass-lined pressure vessel containing a Teflon coated stirring bar using partial pressure of 21.1 kg/cm$^2$ for oxygen and 4.2 kg/cm$^2$ for carbon monoxide. Samples of 0.5 ml were removed from the vessel periodically and titrated for hydrogen peroxide by three methods, cerric sulfate titration; hydrolyzing organic peroxides by stirring for 30 minutes in 50 ml of 1 M $H_2SO_4$ followed by cerric sulfate titration; and iodometric titration in an isopropyl solution. The results of Table A show close agreement of the hydrogen peroxide values, indicating that organic peroxides did not interfere significantly with the results.

TABLE A

| Sample Times | Ceric Sulfate Titration | Hydrolysis Before Titration | Iodometric Titration |
|---|---|---|---|
| 5 min | 0 | 0 | 0 |
| 1 hr | 0 | 0 | 0 |
| 2 hrs | 0.1 | 0.11 | 0.11 |
| 3 hrs | 0.17 | 0.17 | 0.17 |
| 4 hrs | 0.20 | 0.22 | 0.20 |
| 5 hrs | 0.22 | 0.23 | 0.225 |
| 6 hrs | 0.24 | 0.25 | 0.235 | p Other solvents may be used to constitute the working solution in which the reaction is carried out, as illustrated in the following example.

Example 4

A working solution containing 0.177 g (1 milli-mole) of palladium chloride in 20 ml of 2,4-pentanedione and 0.4 ml of distilled water was placed in a 125 ml glass-lined pressured vessel equipped with a Teflon-covered stirred bar and a Teflon sampling tube. The reactor was pressured to provide partial pressures of 12.65 kg/cm$^2$ of both oxygen and carbon monoxide. The reaction was carried out at 25° C. and samples were withdrawn periodically and titrated for $H_2O_2$ content using the iodometric method. The results showed that although no $H_2O_2$ was found after one hour, that after three hours the solution contained 0.15 M $H_2O_2$, after four hours, 0.18 M $H_2O_2$, and after 18 hours, 0.2 M $H_2O_2$. The carbon dioxide content of the gas vented from the reactor was 0.9 vol%.

The following Table B shows results of a series of experiments corresponding to the one described immediately above, but in which the partial pressures of carbon monoxide and oxygen were varied.

TABLE B

| Working Solution | | | | Partial Pressures, kg/cm$_2$ | | $H_2O_2$, M |
|---|---|---|---|---|---|---|
| PdCl$_2$, milli mols | 2,4-pentane-dione, ml | $H_2O$, ml | Time, hrs | $O_2$ | CO | |
| 1 | 19 | 1.0 | 6 | 21.1 | 4.2 | 0.080 |
| 1 | 20 | 0.4 | 4 | 21.1 | 4.2 | 0.080 |
| 2 | 40 | 0.8 | 18 | 4.2 | 21.1 | 0.162 |
| 1 | 20 | 0.4 | 6 | 21.1 | 4.2 | 0.090 |
| 2 | 40 | 0.8 | 4.5 | 4.2 | 21.1 | 0.190 |
| 1 | 20 | 0.4 | 5.0 | 21.1 | 4.2 | 0.050 |
| 1 | 20 | 0.4 | 20 | 12.7 | 12.7 | 0.20 |

It may be concluded from the above table that the production of hydrogen peroxide under these conditions is favored by lower oxygen partial pressures.

Example 5

A solution of 2,4-pentanedione containing 5 mol % water and 0.05 M palladium chloride was contacted with carbon monoxide and oxygen having partial pressures of 21.1 kg/cm$^2$ and 4.2 kg/cm$^2$ respectively, in a 125 ml pressure vessel as previously described. After three hours at 25° C., the solution was measured to contain 0.175 M $H_2O_2$. An equal volume of water was used to extract hydrogen peroxide from the working solution. After decanting the water phase and washing it with ethyl ether to remove dione, a 0.1 M aqueous solution of hydrogen peroxide was obtained.

In the following example, sufficient water was used to create a separate aqueous phase, rather than being fully dissolved in the organic solvent.

Example 6

Into the 125 ml reactor previously described were placed 20 ml of 0.02 M palladium acetate in distilled cyclohexanone and 20 ml of an aqueous solution of 3% titanium sulfate containing 1 ml of concentrated sulfuric acid. The vessel was pressured with 21.1 kg/cm$^2$ of oxygen and 4.2 kg/cm$^2$ of carbon monoxide of the reaction carried out with stirring at 25° C. for six hours. Analysis of the aqueous layer showed it to be 0.03 M hydrogen peroxide.

When 20 ml of 0.02 palladium acetate and 20 ml of an aqueous solution of 3% titanium sulfate containing 1 ml of concentrated $H_2SO_4$ were reacted as described above, the aqueous layer was found to contain 0.0625 M $H_2O_2$, while the organic layer contained 0.038 M $H_2O_2$.

When the experiment was repeated using palladium chloride, both the aqueous and organic layers were found to contain 0.037 M $H_2O_2$.

Other Group 8 noble metals may be used as well as the palladium of the previous examples, as will be seen below.

Example 7

To a working solution of acetone containing 2 mol % water was added enough ruthenium trichloride to make a 0.05 M solution. The solution was titrated with 0.1 N cerric sulfate and no hydrogen peroxide was detected. A 125 ml vessel of the type previously described received 10 ml of the solution and then was pressured to 21.1 kg/cm$^2$ of carbon monoxide and 4.1 kg/cm$_2$ of oxygen. After 5 hours at 25° C. the solution was found to contain 0.055 M $H_2O_2$.

It should be noted that ruthenium with a valence of $+3$ will not produce hydrogen peroxide while ruthenium with a valence of $+2$ will do so, as shown by Pladziewicz et al., Inorganic Chemistry 12, No. 3, 639 (1973). Thus, in order for hydrogen peroxide to be produced in this experiment, it is evident that $Ru^{+3}$ must have been reduced to $Ru^{+2}$ and reoxidized to $Ru^{+3}$ 2.1 times and thus functioned as a catalyst.

Example 8

When Example 7 was repeated using a 0.05 M solution of ruthenium trichloride is dimethyl carbonate saturated with water (approx. 0.5 vol %). After 5 hours at 25° C. under partial pressures of 21.1 kg/cm$^2$ for oxygen and 0.7 kg/cm$^2$ for carbon monoxide the solution was found to contain 0.025 M hydrogen peroxide.

Example 9

A solution of 0.417 g (2 milli moles) of rhodium chloride hydrate in 19 ml of acetone and 1 ml of water was prepared and placed in a 75 ml Teflon-lined pressure vessel, which is then pressured to provide partial pressures of 4.2 kg/cm² oxygen and 25.3 kg/cm² carbon monoxide. After 3 hours at 15° C., titration by $Ce^{+4}$ solfate using a nitroferroin indicator showed the presence of 0.1 M $H_2O_2$. The reaction gases showed that 0.26 milli-moles of carbon dioxide had been formed.

Example 10

The conditions of Example 9 were repeated except that the solution contained 2 milli moles of rhodium chloride hydrate and 0.5 milli moles of palladium chloride. Titration showed that the solution contained 0.16 M $H_2O_2$ after the reaction. The $CO_2$ produced was found to be 0.37 milli-moles.

Example 11

A 0.05 M solution of platinum chloride in acetone containing 2 vol % water was placed in a 125 ml glass-lined vessel, which was pressured with carbon monoxide and oxygen to provide partial pressures of 21.1 kg/cm² carbon monoxide and 4.2 kg/cm² oxygen. After 4.5 hours at 25° C., the solution was titrated and found to contain 0.05 M $H_2O_2$.

When the experiment was repeated using 4.2 kg/cm² carbon monoxide and 21.1 kg/cm² oxygen the solution was found to contain 0.03 M $H_2O_2$.

However, when the experiment was repeated without carbon monoxide, either using 25.3 kg/cm² nitrogen of 21.1 kg/cm² plus 4.2 kg/cm² oxygen, no hydrogen peroxide was formed.

Solid catalysts may also be employed, as illustrated by the following examples.

Example 12

A solid catalyst comprising 1 wt % platinum on graphite was added (0.5 g) to 20 ml of acetone containing 2 vol % water. The solution was pressured to provide 4.2 kg/cm² carbon monoxide and 21.1 kg/cm² oxygen. After 8 hours at 25° C. the solution was found to contain 0.02 M $H_2O_2$.

Repeat experiments using 5 wt % Pd on calcium carbonate and 1 wt % Ru on graphite give the same yield of hydrogen peroxide as did platinum. In another experiment, 0.5 g of 5% Pd on calcium carbonate was used as catalyst in 20 ml of acetone containing 0.5 ml of concentrated HCl, the solution contained 0.025 M $H_2O_2$ after the reaction period.

Example 13

Another solid catalyst was prepared by exchanging 3.3 g of palladium chloride dissolved in 50 ml of 2 N $NH_4OH$ with 10 g of LindeLZY52 (a Na Y zeolite). One gram of the catalyst as placed in a 125 ml glass-lined vessel, along with 10 ml of methylene chloride and 10 ml of water. The reactor was pressured to provide 21.1 kg/cm² oxygen and 4.2 kg/cm² carbon monoxide and maintained at 25° C. for 4 hours, after which the aqueous layer was found to contain 0.025 M $H_2O_2$.

I claim:

1. A process for producing hydrogen peroxide by reacting carbon monoxide, oxygen, and water in the presence of a Group 8 noble metal catalyst wherein the improvement comprises carrying out said reaction at temperatures in the range of $-78°$ to $+150°$ C. in a working solution consisting essentially of water and at least one organic solvent selected from the group consisting of carbonyl compounds and nitriles.

2. The process of claim 1 wherein said organic solvent is a carbonyl compound.

3. The process of claim 2 wherein said carbonyl compound is acetone.

4. The process of claim 2 wherein said Group 8 noble metal compound is a palladium compound.

5. The process of claim 1 wherein said catalyst is employed in a concentration of 0.001 to 0.5 gm-mol for each liter of working solution.

6. The process of claim 5 wherein said catalyst is employed in a concentration of 0.01 to 0.1 gm-mol for each liter of working solution.

7. The process of claim 1 wherein said water is about 0.5 to 5 wt % of said working solution.

8. The process of claim 1 wherein said carbon monoxide and oxygen are maintained at a total pressure above 1 kg/cm² absolute.

9. The process of claim 1 wherein the molar ratio of carbon monoxide is oxygen is between 1/9 and 9/1.

10. The process of claim 1 wherein the temperature is in the range of $-20°$ to $+50°$ C.

* * * * *